Dec. 22, 1959     L. G. BROWN     2,917,795
SOLAR OPERATED LOUVER APPARATUS
Filed Dec. 16, 1957     3 Sheets-Sheet 1
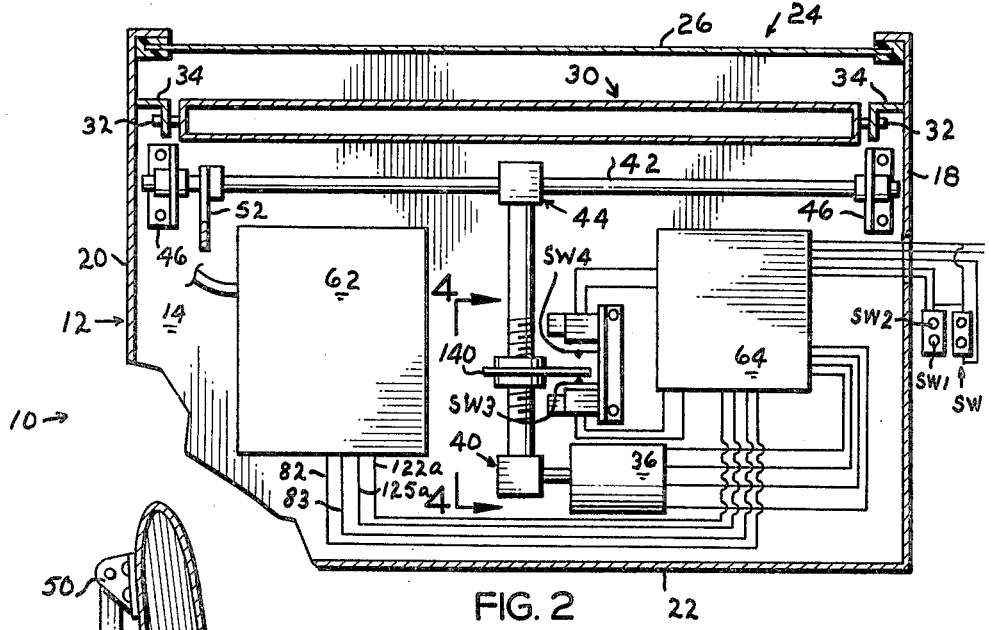
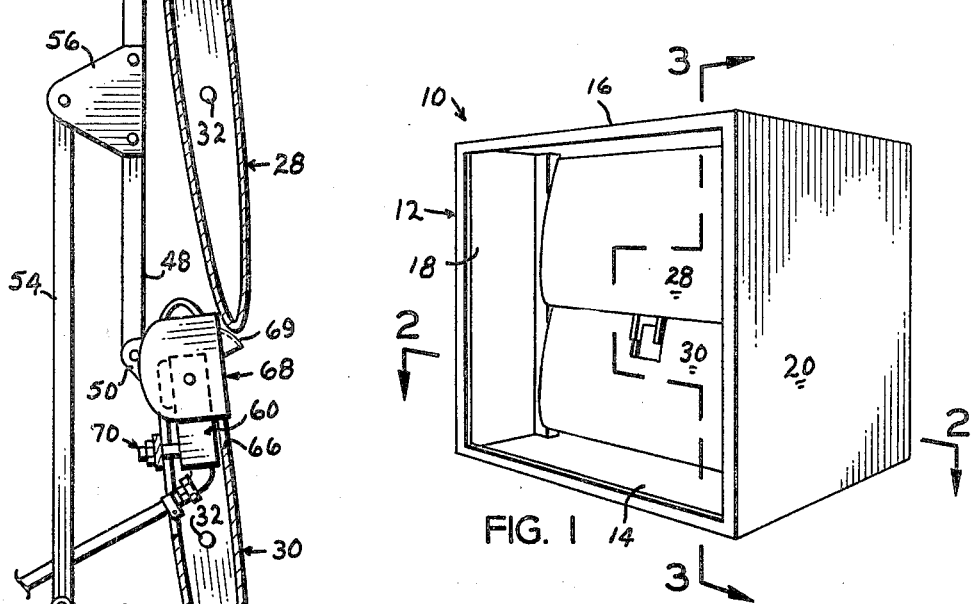
LEMUAL G. BROWN
*INVENTOR.*
BY Loyal J. Miller
ATTORNEY

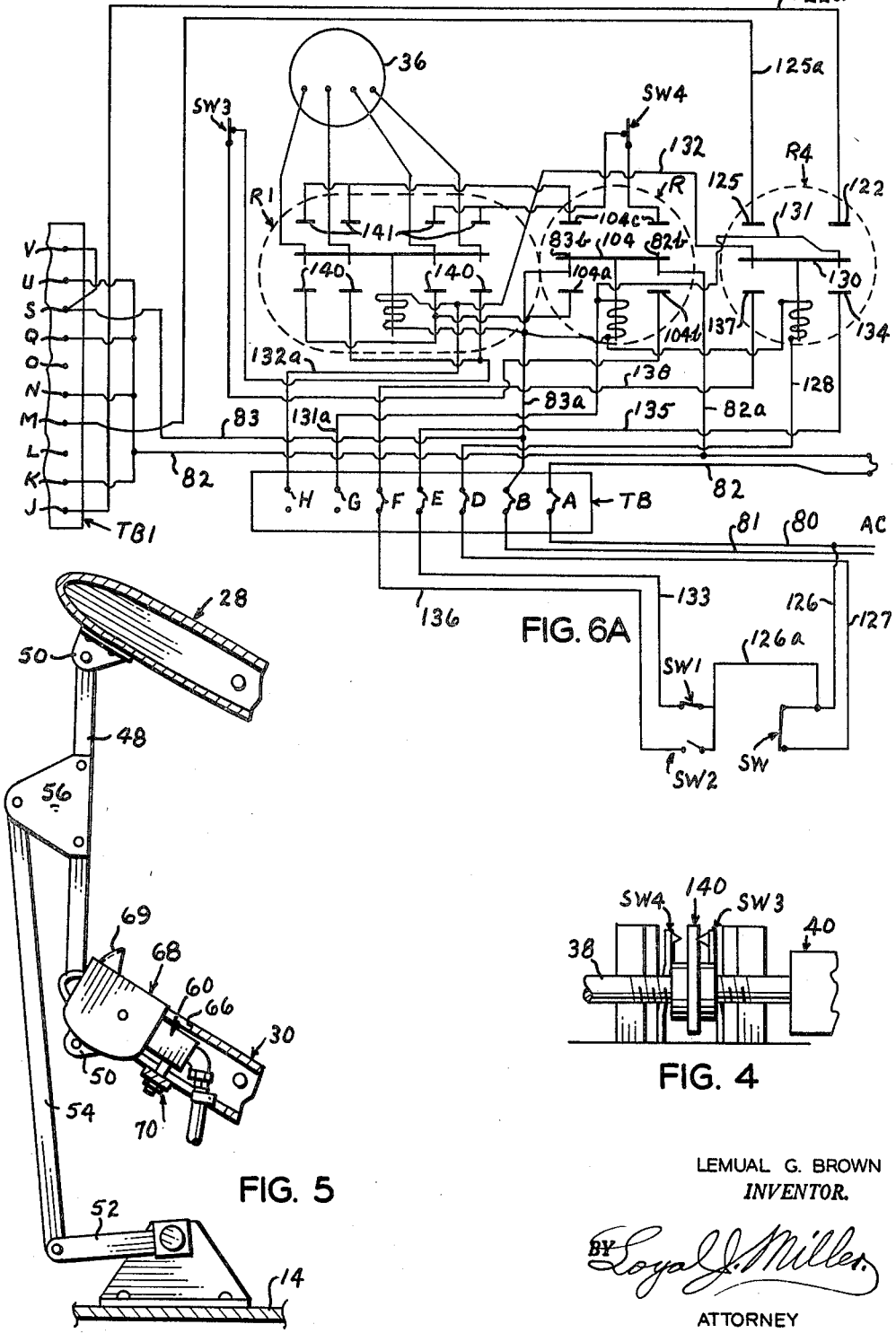

United States Patent Office 2,917,795
Patented Dec. 22, 1959

2,917,795

SOLAR OPERATED LOUVER APPARATUS

Lemual G. Brown, Oklahoma City, Okla.

Application December 16, 1957, Serial No. 702,957

8 Claims. (Cl. 20—62)

The present invention relates generally to louvered apparatus and more particularly to a louver control.

Many office and industrial buildings are now or are being equipped with louvers for covering the windows or openings therein thereby providing a means for controlling the amount of light entering the building as well as providing some protection for glazed openings during stormy weather. These louvers comprise a plurality of blades or slats of metallic, or other suitable material, arranged horizontally or vertically. The louvers are each pivotally mounted adjacent their ends and when horizontally mounted louvers are closed the bottom portion of each preceding blade overlaps the top portion of each succeeding blade. Such a louvered apparatus may have the louvers or blades thereof positioned for admitting passage of substantially all of the light rays falling thereon, and, conversely, the louvers may be closed for shutting out substantially all of the light rays. Such adjustments are highly desirable particularly where the apparatus is used for controlling the amount of sunlight striking a large glazed area such as an office building, or the like, wherein a maximum amount of light is desired, and in which the direct rays of sunlight are objectionable. Time controlled devices have been connected with such louvered apparatus whereby the louvers are moved toward an open or closed position in accordance with a predetermined selected time. This type of installation is fairly satisfactory but requires that the timing or selected times the apparatus is actuated be changed in accordance with the seasons. Furthermore a time control for louvered apparatus does not provide for cloudy or overcast skies wherein it may be desired to leave the louvers in open position to admit a maximum amount of the available light.

It is therefore the principal object of the present invention to provide a solar control for a louver apparatus.

A similarly important object is to provide a solar control which will progressively open or close the blades of a louvered apparatus and permit a maximum amount of sunlight to pass therethrough and yet shield the louver-covered opening from the direct rays of sunlight.

Another object of the invention is the provision of a control of this class which, being responsive to the intensity of sunlight, will maintain the horizontally or vertically mounted louvers of a louver-covered opening in maximum light admitting position on dark or overcast days.

Another object of the present invention is the provision of time delay means within the solar control for preventing actuation of the control by the momentary passage of shadows.

A further object is to provide a solar control for a louver apparatus which may be selectively operated manually.

The present invention accomplishes these and other objects by providing a rectangular frame having a plurality of louvers or blades pivotally mounted horizontally therein in overlapping relation. Linkage and gear means operatively connects the blades to a reversible motor and a driven shaft for opening and closing the blades. Current amplifying means is interposed between the cell and the motor for actuating the motor and opening or closing the louver blades responsive to the intensity of light received by the cell. A source of electrical energy supplies the power for operating the system.

Other objects will be apparent from the following description when taken in conjunction with the accompanying three sheets of drawings, wherein:

Figure 1 is a perspective view of the device;

Figure 2 is a horizontal sectional view, partly in elevation, taken substantially along line 2—2 of Fig. 1;

Figure 3 is a fragmentary vertical sectional view taken substantially along line 3—3 of Fig. 1;

Figure 4 is a fragmentary elevational view of the motor limit switches taken substantially along the line 4—4 of Fig. 2;

Figure 5 is a view similar to Fig. 3 illustrating the blades of the apparatus in a substantially open position;

Figure 6A is a continuation of the diagram of Fig. 6 diagrammatically illustrating the manner of connecting the motor to the current amplifying means through reversing relays.

Like characters of reference designate like parts in those figures of the drawings in which they occur.

In the drawings:

Figure 6:
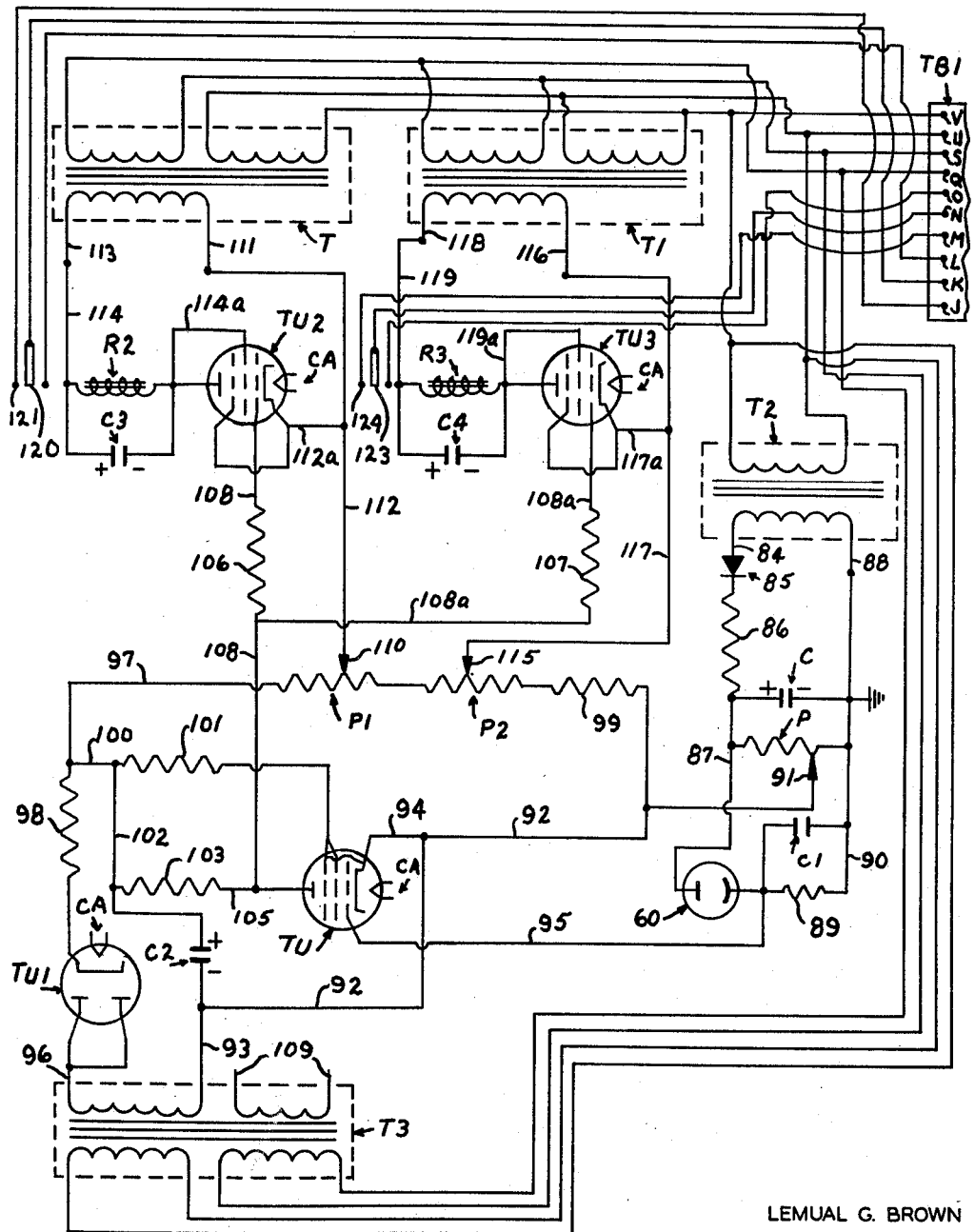
Figure 6 is a wiring diagram of the current amplifying means.

Referring more particularly to Figs. 1 through 5, the reference numeral 10 indicates, as a whole, a louver control apparatus which includes a rectangular frame 12 having a bottom 14, top 16, sides 18 and 20, back 22 and an open front 24. The front is normally closed by a glass panel 26 so that light may enter the frame therethrough. A pair of louvers or blades 28 and 30 are disposed transversely of the frame in vertical staggered overlapping relation. Each respective end of each blade is provided with a shaft 32 journaled by a vertically disposed support 34 carried by each of the frame sides 18 and 20 thus forming a horizontal axis for vertical pivoting movement of the blades. As shown in Figs. 1, 3 and 5 the lower portion of the upper or preceding blade 28 overlaps the upper portion of the lower or succeeding 30 when the blades are in closed position. The particular configuration of the louvers or blades 28 and 30 is not critical since they may be formed hollow, as shown, or comprise a single thickness of material. It is important, however, that the blades be disposed in overlapping relation so that rays of sunlight entering the open front 24 through the glass 26 may strike the upper blade 28 and shade a portion of the lower blade 30 for the reasons more fully disclosed hereinbelow.

A reversible motor 36 mounted on the bottom 14 within the frame 12 is drivably connected to a drive shaft 38 through a gear train 40. The drive shaft 38 in turn drives a driven shaft 42 through a second gear means 44. The driven shaft 42 is transversely journaled between bearing supports 46 carried by the frame bottom 14. As shown more clearly in Figs. 3 and 5 a link 48 extends between and is pivotally connected to each of the blades 28 and 30 by brackets 50. A pitman or arm 52 is rigidly connected at one end of the driven shaft 42 and pivotally connected at its other end to one end of a second link 54 which is in turn pivotally connected to the first link 48 by a bracket 56. Thus, actuation of the motor 36 in one direction rotates the driven shaft 42 so that the arm 52 is raised from the position shown in Fig. 5 to the position shown by Fig. 3 which in turn pivots the blades 28 and 30 about their horizontal axes and disposes them in the closed position of Fig. 3. Conversely, actuation of the motor in the opposite direction lowers the arm 52 and pivots the blades 28 and 30 to an open position as exemplified by Fig. 5.

Thus, it may be seen that actuation of the motor in a selected direction at proper times will dispose the blades or louvers 28 and 30 so that none of the direct rays of sunlight falling on the louvers will be permitted to pass therebetween and yet will permit the entry of a maximum amount of light into the area beyond the louvers. Such adjustment of the louvers is accomplished by means of the intensity of sunlight striking the louvers and an "electric-eye" or photoelectric cell 60 carried by the upper portion of the lower blade 30. Current amplifying means 62 connected with the photoelectric cell 60 energizes reversing relay means 64 which in turn operates the motor 36 from a source of electrical energy, not shown, for progressively moving the louvers toward a closed or open position in accordance with the intensity of the rays of the sun.

The photoelectric cell 60 is conventional and is placed within a recess or slot 66 formed in the top or upper edge portion of the bottom blade 30 so that direct rays of sunlight will not contact the light sensitive cathode of the cell. The recess 66 is preferably lined or walled with a suitable material having a light reflecting surface thus forming a shadow box or receptacle 68 open toward the open front of the frame 12. The photoelectric cell 60 is inserted into the box 68 from the rearward side of the blade 30 through an opening provided in one wall of the box. The cell 60 is held in place within the box 68 by bolt and nut means 70 connected to the blade 30 (Figs. 3 and 5). A portion of the reflective lining is extended upward arcuately from the end of the box 68 opposite the cell 60, as at 69, for the purposes described later.

Referring now more particularly to Figs. 6 and 6A it may be seen that alternating current from a source of supply, not shown, is fed to posts A and B of a terminal block TB by the wires 80 and 81. Wire 82, connected with post A, carries current to four posts K, N, Q and U of a second terminal block TB1 and one branch 82A of wire 82 is connected with the armature 104 of a 2-pole double throw reversible relay R at 82b. Wire 83, connected with wire 81, carries current to two posts S and V of terminal block TB1 while a branch wire 83a of wire 83 is connected to the coil and to the armature of relay R at 83b, to the coil of a motor energizing 4-pole double throw reversible relay R1 and to the coil of relay R4. The posts Q, S, U and V of terminal block TB1 are connected to the primary windings of four transformers T, T1, T2, and T3 by suitable wiring for energizing the transformers.

One lead 84 of the secondary winding of transformer T2 is connected to the anode of the photoelectric cell 60 through a rectifier 85 and a suitable resistance 86 by positive current wire 87. The other lead 88 of the secondary winding of transformer T2 is connected to the cathode of the cell 60 through a resistance 89 by wire 90. A condenser C is connected in series to the wires 87 and 88 and grounded on the negative side for the purposes more fully disclosed hereinbelow. A condenser C1 is connected in parallel with the resistance 89 to the wire 90. A potentiometer P is connected across the wires 87 and 90 and the sliding contact 91 thereof is connected by a wire 92 to one of the leads 93 of the first secondary winding of the transformer T3. One branch 94 of the wire 92 is connected with the plate of a thermionic amplifying pentode tube TU. The cathode of the cell 60 is connected to one of the electrodes of tube TU by a wire 95. The other lead 96 of the first secondary winding of the transformer T3 is connected to the anodes of a rectifier tube TU1. The plate of the rectifier tube TU1 is connected by a wire 97 to the wire 92 through resistors 98, 99 and a pair of potentiometers P1 and P2. One branch 100 of the wire 97 is connected to the remaining two electrodes and the plate of the tube through a resistor 101. A wire 102 connects the secondary winding lead 93 of transformer T3 to the wire 100 through a condenser C2. Wire 102 is connected to the anode of tube TU through a resistor 103 by wire 105. Wire 105 is connected through resistors 106 and 107 to an electrode in each of a pair of thermionic amplifying pentode tubes TU2 and TU3 by wires 108 and 108a. The leads 109 of the second secondary winding of transformer T3 are connected in series to the cathodes CA of each of the tubes TU, TU1, TU2 and TU3.

The sliding contact 110 of the potentiometer P1 is connected to the lead 111 of the secondary winding of the transformer T by wire 112. One branch 112a of wire 112 is connected to the plate and one electrode of tube TU2. The other lead 113 of the secondary winding of the transformer T is connected to the anode of tube TU2 through a relay R2 and a condenser C3, connected in parallel, by a wire 114. One branch 114a of wire 114 is connected to the remaining electrode of tube TU2.

The sliding contact 115 of the potentiometer P2 is connected to one lead 116 of the secondary winding of the transformer T1 by a wire 117. A branch 117a of the wire 117 is connected with the plate and one electrode of the tube TU3. Similarly the other lead 118 of the secondary winding of the transformer T1 is connected to the anode of tube TU3 through a relay R3 and condenser C4, connected in parallel, and a branch wire 119a of wire 119 is connected to the remaining electrode of the tube TU3.

The armature 120 of relay R2 is connected to the current source wire 82 through terminal block posts K. One contact 121 of the armature 120 is connected to the terminal block posts J which are in turn connected to one of the poles 122 of the 2-pole double throw reversible relay R4 by a wire 122a. The other contact of armature 120 is dead ended on the inactive terminal block post L. The armature 123 of relay R3 is connected to the current source wire 82 through the terminal block posts N. One contact 124 of armature 123 is connected to the terminal block posts M which are in turn connected to the pole 125 of the relay R4 by a wire 125a. The other contact of the armature 123 is dead ended on the inactive terminal block post O.

A positive action open or closed switch SW is connected at one side to the current source wire 80 by wire 126. Wire 127 connects the other side of switch SW to the post D of terminal block TB which is in turn connected by a wire 128 to the coil of relay R4 thus completing a circuit through the coil of relay R4 over wire 83a back to current source wire 81 when the switch SW is closed. Thus, when switch SW is open the relay R4 remains de-energized and the apparatus is in position for automatic operation.

*Operation*

Consider the louvers 28 and 30 in open position as shown in Fig. 5. Potentiometers P, P1 and P2 are adjusted to the selected sensitivity of current from the cell 60. Rays of light falling on the shadow box 68 increases the current from the photoelectric cell 60 which is amplified by the tube TU. If the angular tilt of the blades positions the top of the box 68 parallel with the rays of sunlight, then the light rays are reflected into the box from the lining projection 69. The output or anode side of tube TU is connected by wires 108 and 108a to an electrode or grid in each of the tubes TU2 and TU3. Thus, amplified current from cell 60 introduced into the tubes TU2 and TU3 interferes with or reduces the current through these tubes which releases the armature 120 and 123 of relays R2 and R3 to make with their respective contacts 121 and 124. This closes the circuit to poles 122 and 125 of relay R4 and energizes the coils of relays R and R1. The armature 104 of relay R then makes with its poles 104a and 104b which are in turn connected to the poles 140 of relay R1, thus actuating the motor 36 for closing the blades 28 and 30. When the blade 28 casts a shadow over the cell 60 during the closing action, or when the intensity of light received by the cell 60 falls below a predetermined setting of potentiometer P2, the current from the tube TU is reduced permitting tube TU3 to energize relay R3 and pull armature 123 out of contact with contact point 124. This de-energizes the coil of relay R1 and breaks the contact of its armature with poles 140 thus stopping the blade closing action of the motor 36. If the intensity of light decreases further below the predetermined setting of potentiometer P1 tube TU2 pulls armature 120 of relay R2 out of contact with its contact point 121 thus de-energizing the coil of relay R so that its armature 104 makes with its poles 104c conducting current to the poles 141 of relay R1 which operates the motor 36 for opening the blades.

Stated more briefly, a high level of light intensity releases armatures 120 and 123 of relays R2 and R3, to make with their respective points 121 and 124, actuating the motor to close the blades 28 and 30. When the desired intensity of light passing through the blades has been reached, tube TU3 restores armature 123 of relay R3 to stop the blade closing action of the motor. When the light intensity level falls still lower tube TU2 restores armature 120 of relay R2 to start the blade opening action of the motor. Thus, a floating or fluctuating action is obtained for progressively opening or closing the blades by the low or high level of light intensity received by the cell 60. Direct or full sunlight on the cell 60 maintains the blades in closed position while absence of light, such as cloudy or overcast days, maintains the blades or louvers in full opened position.

Condenser C connected in series with potentiometer P to cell 60 provides a holding or time delay circuit which prevents actuation of the relays R2 and R3 and closing of the louvers by shadows momentarily falling on the cell by a passing object. Thus, the time delay period, for actuating the apparatus, may be lengthened or shortened by the choice of the capacity of the condenser C.

It may be desirable to operate the apparatus manually for opening or closing the louvers and this is accomplished by closing the switch SW which closes the circuit energizing the relay R4 for contact with the poles 134 and 137. Wire 126a connected with wire 126 is connected with a pair of switches SW1 and SW2. Switch SW1 is normally closed and is connected by a wire 133 to terminal block post E which is in turn connected to the pole 134, opposite the low level light intensity pole 122 of relay R4, by a wire 135. Thus opening switch SW1 interrupts a circuit from current source wire 80 to pole 134 of relay R4 in contact with armature 130 de-energizing relay R so that its armature 104 makes with its poles 104c to operate the motor 36 in the louver opening direction.

Similarly switch SW2, normally open, is connected by a wire 136 to terminal block post F which is in turn connected to pole 137, opposite the high level light intensity pole 125 of relay R4, by wire 138. Closing switch SW2 completes a circuit from current source wire 80 to pole 137 of the relay R4 in contact with its armature 130 energizing the coil of relay R1 and operating the motor 36 in a direction for closing the louvers 28 and 30.

A pair of limit switches SW3 and SW4, both normally closed, are carried by the frame bottom 14 and are connected respectively in the circuits of the opposing poles of the relays R and R1 for interrupting the circuit to the poles of these relays and stopping the operation of the motor 36 when either switch SW3 or SW4 is opened. The purpose of the limit switches SW3 and SW4 is to prevent damage being done to the louver apparatus by failure of either of the relays R2 or R3. These limit switches are disposed adjacent the shaft 38 and on opposing sides of a limit guide 140 threadedly carried by the shaft 38 (Figs. 2 and 4). Thus, as the motor 36 revolves the shaft 38 in one direction for opening the louvers 28 and 30, the guide 140 is progressively moved toward the limit switch SW4. If the armature 123 of relay R3 fails to make with contact 124 the guide 140 opens the switch SW4 which breaks the circuit between poles 104 and 141 of the respective relays R and R1 and stops the motor. Conversely, operation of the motor 36 in revolving the shaft 38 in the opposite direction to close the louvers progressively moves the guide 140 in the opposite direction toward the switch SW3 and upon failure of the relay R2 will open the switch SW3 to stop the motor.

The apparatus is located in a desired position where the intensity of light received by the cell 60 will be substantially equal to that falling on the louvers to be controlled. The device 10 is preferably used as a controlling unit for operating a motor or motors similarly connected to the louver installation to be controlled. It may be seen in Fig. 6a that a branch wire 131a connected with wire 131 and the coil of relay R is connected to terminal block post G. Similarly a branch wire 132a connected with wire 132 and the coil of relay R1 is connected to terminal block post H.

It seems obvious, that wires, not shown, connected with posts G and H and leading to similar relays and other motors in co-operation with the common source of electrical energy will energize such relays and motors in a manner similar to that disclosed hereinabove for motor 36.

If desired the cell 60 may be carried by one of the louvers being controlled. At night and before sunrise the low level of light intensity maintains the louvers in full open position as disclosed hereinabove. As the light intensity increases with the rising of the sun the louvers are progressively closed. Similarly on dark, or overcast days the louvers are maintained in open or nearly open position thus permitting the maximum amount of light to pass therethrough.

While the operation of horizontally mounted louvers have been illustrated and described herein it is to be understood that the device is equally adaptable for mounting on and operating vertically mounted louvers.

Obviously the invention is susceptible to some change or alteration without defeating its practicability, and I therefore do not wish to be confined to the preferred embodiment shown in the drawings and described herein, further than I am limited by the scope of the appended claims.

I claim:

1. A solar operated louver apparatus, comprising: a substantially rectangular frame having an open front; a plurality of blades arranged therein in horizontal staggered relation so that the bottom of each preceding blade overlaps the forwardly disposed top portion of each succeeding blade when said blades are in closed position; a shaft carried by the respective ends of said blades and journaled by the sides of said frame; a driven shaft carried by said frame adjacent said blades; linkage operatively connecting said blades with said driven shaft for vertical pivoting movement of said blades by the action of said driven shaft; a reversible motor having a drive shaft drivably connected to said driven shaft; a photoelectric cell carried by one of said blades; a source of electrical energy connected to said motor; and current amplifying means interposed between said cell and said motor, said current amplifying means including a thermionic amplifier tube connected with said cell, first and second thermionic tubes connected with said thermionic amplifier tube, first and second relays connected with said first and second thermionic tubes, respectively, said first thermionic tube being responsive to the high level of electron emission from said cell for releasing said first relay and starting said motor in a louver closing direction, said second thermionic tube being responsive to the low level of electron emission from said cell for releasing said second relay and starting said motor in a louver opening direction, whereby when both said first and said second relays are simultaneously released or restored said motor is energized for rotating in the respective louver closing or opening direction and whereby said motor is de-energized when either one of said first and second relays is released or restored in opposition to the other one in response to the respective high or low level of electron emission from said cell.

2. A solar operated louver apparatus, including; a substantially rectangular frame having an open front; a pair of blades arranged in horizontal staggered relation in said frame so that the bottom portion of the upper blade overlaps the upper forwardly disposed portion of the lower blade when in closed position; a shaft carried by the respective ends of each said blade and journaled by the sides of said frame; a driven shaft carried by said frame; linkage operatively connecting said blades with said driven shaft for vertically pivoting said blades about their respective horizontal axes by the action of said driven shaft; a reversible motor drivably connected to said driven shaft; a photoelectric cell carried by the lower one of said blades adjacent its upper portion; a source of electrical energy connected to said motor; and current amplifying means interposed between said cell and said motor, said current amplifying means including a thermionic amplifier tube connected with said cell, first and second thermionic tubes connected with said thermionic amplifier tube, first and second relays connected with said first and second thermionic tubes, respectively, said first thermionic tube being responsive to the high level of electron emission from said cell for releasing said first relay and starting said motor in a louver closing direction, said second thermionic tube being responsive to the low level of electron emission from said cell for releasing said second relay and starting said motor in a louver opening direction, whereby when both said first and said second relays are simultaneously released or restored said motor is energized for rotating in the respective louver closing or opening direction and whereby said motor is de-energized when either one of said first and second relays is released or restored in opposition to the other one in response to the respective high or low level of electron emission from said cell.

3. A solar operated louver apparatus, including: a rectangular frame having an open front; a pair of blades arranged horizontally in vertical staggered relation within said frame so that the bottom portion of the upper blade overlaps the upper portion of the lower blade when the blades are in closed position; a shaft carried by the respective ends of each said blade and journaled by the adjacent sides of said frame; a driven shaft carried by said frame; linkage operatively connecting said driven shaft with said blades for pivoting said blades vertically about their respective horizontal axes by the action of said driven shaft; a reversible motor drivably connected to said driven shaft; a photoelectric cell carried by the lowermost said blade adjacent its upper edge portion; a source of electrical energy connected to said motor and said cell; and current amplifying means interposed between said cell and said motor, said current amplifying means including a thermionic amplifier tube connected with said cell, first and second thermionic tubes connected with said thermionic amplifier tube, first and second relays connected with said first and second thermionic tubes, respectively, said first thermionic tube being responsive to the high level of electron emission from said cell for releasing said first relay and starting said motor in a louver closing direction, said second thermionic tube being responsive to the low level of electron emission from said cell for releasing said second relay and starting said motor in a louver opening direction, whereby when both said first and said second relays are simultaneously released or restored said motor is energized for rotating in the respective louver closing or opening direction and whereby said motor is de-energized when either one of said first and second relays is released or restored in opposition to the other one in response to the respective high or low level of electron emission from said cell.

4. A solar operated louver apparatus, including: a rectangular frame having an open front; a pair of blades arranged horizontally in vertical staggered relation within said frame so that the bottom portion of the upper blade overlaps the upper portion of the bottom blade when said blades are in closed position, said bottom blade having a recess in its upper forward edge portion; a shaft carried by the respective ends of each of said blades, said shafts being journaled by the respective adjacent sides of said frame; a driven shaft carried by said frame; linkage operatively connecting said driven shaft with said blades for pivoting said blades about their respective horizontal axes by the action of said driven shaft; a reversible motor drivably connected to said driven shaft; a photoelectric cell carried by the recess in said lowermost blade; a source of electrical energy connected to said motor and said cell; and current amplifying means interposed between said cell and said motor whereby said blades are opened or closed by energizing said motor responsive to, or the absence of, light entering said open front and contacting said cell, said current amplifying means including a thermionic amplifier tube connected with said cell, first and second thermionic tubes connected with said thermionic amplifier tube, first and second relays connected with said first and second thermionic tubes, respectively, said first thermionic tube being responsive to the high level of electron emission from said cell for releasing said first relay and starting said motor in a louver closing direction, said second thermionic tube being responsive to the low level of electron emission from said cell for releasing said second relay and starting said motor in a louver opening direction, whereby when both said first and said second relays are simultaneously released or restored said motor is energized for rotating in the respective louver closing or opening direction and whereby said motor is de-energized when either one of said first and second relays is released or restored in opposition to the other one in response to the respective high or low level of electron emission from said cell.

5. A solar operated louver apparatus, including: a frame having an open front; a pair of blades arranged horizontally in vertical staggered relation within said frame so that the bottom portion of the upper blade overlaps the upper portion of the bottom blade when said blades are in closed position, said bottom blade having a recess in its upper forward edge portion; a shaft carried by the respective ends of each of said blades, said shafts being journaled by the respective adjacent sides of said frame; a driven shaft carried by said frame; linkage operatively connecting said driven shaft with said blades for pivoting said blades about their respective horizontal axes by the action of said driven shaft; a reversible electric motor drivably connected to said driven shaft; reversing relays connected to said motor; a photoelectric cell carried by the recess in said lowermost blade; current amplifying means connecting said cell to said reversing relays; and a source of electrical energy connected to said relays and said cell, said current amplifying means including a thermionic amplifier tube connected with said cell, first and second thermionic tubes connected with said thermionic amplifier tube, first and second relays connected with said first and second thermionic tubes, respectively, said first thermionic tube being responsive to the high level of electron emission from said cell for releasing said first relay and starting said motor in a louver closing direction, said second thermionic tube being responsive to the low level of electron emission from said cell for releasing said second relay and starting said motor in a louver opening direction, whereby when both said first and said second relays are simultaneously released or restored said motor is energized for rotating in the respective louver closing or opening direction and whereby said motor is de-energized when either one of said first and second relays is released or restored in opposition to the other one in response to the respective high or low level of electron emission from said cell.

6. A solar control for a louver apparatus having a frame and having a plurality of blades pivotally mounted horizontally in vertical staggered relation within said frame so that the bottom portion of each preceding blade overlaps the upper portion of each succeeding blade when said blades are in closed position, including: a driven shaft carried by said frame; linkage means connecting said driven shaft to said blades for pivoting the latter when the shaft is rotated; a reversible motor drivably connected to said driven shaft; a photoelectric cell carried by the upper portion of one of said blades; a source of electrical energy connected to said motor and said cell; and current amplifying means interposed between said cell and said motor for energizing said motor and opening or closing said blades responsive to the light intensity received by said cell, said current amplifying means including a thermionic amplifier tube connected with said cell, first and second thermionic tubes connected with said thermionic amplifier tube, first and second relays connected with said first and second thermionic tubes, respectively, said first thermionic tube being responsive to the high level of electron emission from said cell for releasing said first relay and starting said motor in a louver closing direction, said second thermionic tube being responsive to the low level of electron emission from said cell for releasing said second relay and starting said motor in a louver opening direction, whereby when both said first and said second relays are simultaneously released or restored said motor is energized for rotating in the respective louver closing or opening direction and whereby said motor is de-energized when either one of said first and second relays is released or restored in opposition to the other one in response to the respective high or low level of electron emission from said cell.

7. A solar controlled louver apparatus having a plurality of blades pivotally mounted within a frame so that one edge portion of each preceding blade overlaps the adjacent edge portion of each succeeding blade when said blades are in closed position, including; a driven shaft carried by said frame; linkage means connecting said driven shaft to said blades for pivoting the latter when the shaft is rotated; a reversible motor drivably connected to said driven shaft; a photoelectric cell carried by one edge portion of one of said blades; a source of electrical energy connected to said motor; and current amplifying means interposed between said cell and said motor for energizing said motor and opening or closing said blades responsive to the light intensity received by said cell, said current amplifying means including a thermionic amplifier tube connected with said cell, first and second thermionic tubes connected with said thermionic amplifier tube, first and second relays connected with said first and second thermionic tubes, respectively, said first thermionic tube being responsive to the high level of electron emission from said cell for releasing said first relay and starting said motor in a louver closing direction, said second thermionic tube being responsive to the low level of electron emission from said cell for releasing said second relay and starting said motor in a louver opening direction, whereby when both said first and said second relays are simultaneously released or restored said motor is energized for rotating in the respective louver closing or opening direction and whereby said motor is de-energized when either one of said first and second relays is released or restored in opposition to the other one in response to the respective high or low level of electron emission from said cell.

8. A solar controlled louver apparatus having a plurality of blades pivotally mounted within a frame so that one edge portion of each preceding blade overlaps the adjacent edge portion of each succeeding blade when said blades are in closed position, including: a driven shaft carried by said frame; linkage means connecting said driven shaft to said blades for pivoting the latter when the shaft is rotated; a reversible motor drivably connected to said driven shaft; a photoelectric cell carried by the upper portion of one of said blades; a source of electrical energy connected to said motor; a first circuit means responsive only to the absence of light for increasingly amplifying the current interposed between said cell and said motor for energizing said motor to operate in one direction and open said blades; a condenser interposed in said circuit for delaying the action of said first circuit means; and a second circuit means responsive to the intensity of light interposed between said cell and said motor and connected with said first circuit means for energizing said motor to operate in a direction opposite the first named direction and close said blades, said first and said second circuit means including a thermionic amplifier tube connected with said cell, first and second thermionic tubes connected with said thermionic amplifier tube, first and second relays connected with said first and second thermionic tubes, respectively, said first thermionic tube being responsive to the high level of electron emission from said cell for releasing said first relay and starting said motor in a louver closing direction, said second thermionic tube being responsive to the low level of electron emission from said cell for releasing said second relay and starting said motor in a louver opening direction, whereby when both said first and said second relays are simultaneously released or restored said motor is energized for rotating in the respective louver closing or opening direction and whereby said motor is deenergized when either one of said first and second relays is released or restored in opposition to the other one in response to the respective high or low level of electron emission from said cell.

References Cited in the file of this patent

UNITED STATES PATENTS

| | | |
|---|---|---|
| 2,083,726 | Mason | June 15, 1937 |
| 2,198,488 | Smith | Apr. 23, 1940 |